US009840624B2

(12) United States Patent
Bluvol et al.

(10) Patent No.: US 9,840,624 B2
(45) Date of Patent: *Dec. 12, 2017

(54) COARSE PIGMENT ADDITION AND HIGH SOLIDS SLURRIES FOR HIGHER COATING COLOUR CONCENTRATIONS

(71) Applicant: Omya International AG, Oftringen (CH)

(72) Inventors: Guillermo Bluvol, Gretzenbach (CH); Michael Kässberger, Sempach (CH); Patrick A. C. Gane, Rothrist (CH)

(73) Assignee: Omya International AG, Oftringen (CH)

( * ) Notice: Subject to any disclaimer, the term of this patent is extended or adjusted under 35 U.S.C. 154(b) by 0 days.

This patent is subject to a terminal disclaimer.

(21) Appl. No.: 15/401,348

(22) Filed: Jan. 9, 2017

(65) Prior Publication Data

US 2017/0114223 A1    Apr. 27, 2017

Related U.S. Application Data

(62) Division of application No. 13/496,960, filed as application No. PCT/EP2010/063866 on Sep. 21, 2010, now Pat. No. 9,574,305.

(60) Provisional application No. 61/340,061, filed on Mar. 11, 2010.

(30) Foreign Application Priority Data

Sep. 21, 2009    (EP) .................................... 09170864

(51) Int. Cl.

| C08K 3/26 | (2006.01) |
| C09C 1/02 | (2006.01) |
| C01F 11/18 | (2006.01) |
| C09D 17/00 | (2006.01) |
| C04B 14/28 | (2006.01) |
| D21H 19/38 | (2006.01) |
| C09J 11/04 | (2006.01) |
| D21H 17/68 | (2006.01) |

(52) U.S. Cl.
CPC ............ C09C 1/021 (2013.01); C01F 11/185 (2013.01); C04B 14/28 (2013.01); C04B 14/285 (2013.01); C09D 17/004 (2013.01); C09J 11/04 (2013.01); D21H 19/385 (2013.01); *C01P 2004/51* (2013.01); *C01P 2004/61* (2013.01)

(58) Field of Classification Search
CPC .. C09C 1/42; C09C 1/02; C09C 1/021; D21H 17/68; C08K 3/26
See application file for complete search history.

(56) References Cited

U.S. PATENT DOCUMENTS

| 3,714,107 A | 1/1973 | Smith |
| 4,284,546 A | 8/1981 | Delfosse et al. |
| 5,292,365 A | 3/1994 | Delfosse |
| 6,149,723 A | 11/2000 | Pruett et al. |
| 9,574,305 B2* | 2/2017 | Bluvol .................. C01F 11/18 |
| 2006/0102304 A1 | 5/2006 | Nutbeem et al. |
| 2006/0292305 A1 | 12/2006 | Skuse et al. |
| 2010/0180800 A1 | 7/2010 | Munchow et al. |

FOREIGN PATENT DOCUMENTS

| DE | 3924846 A1 | 2/1991 |
| DE | 102004023864 A1 | 12/2005 |
| EP | 0309462 B1 | 12/1991 |
| GB | 1537512 A | 12/1978 |
| JP | 070300568 A | 11/1995 |
| JP | 2000034120 A | 2/2000 |
| WO | 2004059079 A2 | 7/2004 |
| WO | 2005012157 A2 | 12/2005 |
| WO | 2007083208 A1 | 7/2007 |
| WO | 2009000659 A2 | 12/2008 |

OTHER PUBLICATIONS

English Translation of Office Action dated Dec. 1, 2015 for JP 2012-530241.
Druckexemplar in Opposition Procedure.
New First Auxiliary Request dated Apr. 22, 2015.
Omya's Response to Opposition dated Aug. 27, 2013 for EP 2302131.
Omya's Grounds of Appeal dated Sep. 28, 2015 for EP 2302131.
Imerys Grounds of Appeal dated Sep. 29, 2015 for EP 2302131.
Omya's Reply to Grounds of Appeal dated Feb. 10, 2016 for EP 2302131.
Imery's Response to Grounds of Appeal dated Feb. 11, 2016 for EP 2302131.
Imery's Response to Proprietor Counter Statement dated Aug. 12, 2016 for EP 2302131.
Allen "Powder Sampling and Particle Size Determination." 2003 Elsevier, 115-122.
Crawshaw et al. "The influence of pigment particle shape on the performance of a paper coating." 1982 Coating Conference, 143-164.
Provision of the minutes in accordance with Rule 124(4) EP dated May 19, 2015 in connection with European Patent Application No. 09 1709 864.4, 11 pages.
Interlocutory decision in Opposition proceedings (Art. 101(3)(a) and 106(3)(a) EPC) dated May 19, 2015 in connection with European Patent Application No. 09 1709 864.4, 14 pages.

(Continued)

*Primary Examiner* — Pegah Parvini
(74) *Attorney, Agent, or Firm* — Amster, Rothstein & Ebenstein LLP

(57) ABSTRACT

The present invention relates to an aqueous slurry comprising natural ground calcium carbonate which has a percentage $P_5$ by weight of particles having a diameter of less than 5.0 μm of from 98.5% to 90%, a percentage $P_2$ by weight of particles having a diameter of less than 2.0 μm of from 96% to 80%, wherein the ratio of $P_2/P_5$ is from 0.98 to 0.85, and wherein the slurry has a solids content of more than 78 wt %.

15 Claims, No Drawings

(56) References Cited

OTHER PUBLICATIONS

Opposition to European Patent No. 2302131, dated Jan. 18, 2013.
"Rheology of slurries and coating colours." Technical Guides—Rheology 1-4.
Knappich et al. "Wet and dry coating structure of calcium carbonate pigments with narrow particle size distribution." Tappi Journal (2000), vol. 83.2, 91-98.
Brydson "Plastic materials." Butterworths Fifth Edition 1989.
The International Search Report dated Mar. 3, 2011 for PCT Application No. PCT/EP2010/063866.
The Written Opinion of International Searching Authority dated Mar. 3, 2011 for PCT Application No. PCT/EP2010/063866.

* cited by examiner

COARSE PIGMENT ADDITION AND HIGH SOLIDS SLURRIES FOR HIGHER COATING COLOUR CONCENTRATIONS

CROSS-REFERENCE TO RELATED APPLICATIONS

This is a divisional of U.S. application Ser. No. 13/496,960, which is a U.S. National Phase of PCT Application No. PCT/EP2010/063866, filed Sep. 21, 2010, which claims priority to European Application No. 09170864.4, filed Sep. 21, 2009 and U.S. Provisional Application No. 61/340,061, filed Mar. 11, 2010, the contents of which are hereby incorporated by reference.

Coated paper producers today face an immense challenge searching for business profitability whilst experiencing fierce market conditions. In recent years, coating formulations have been significantly simplified, binder levels have reduced to very low levels.

The solids content of coating colours is overall regarded as one important option to further improve production costs. The potential advantages of higher dry solids are numerous in terms of quality, environmental aspects and economics:
- Significant savings in drying energy or higher coater speeds are possible when drying capacity is limited. With an increase of solids content of e.g. 3%, it is already possible to achieve significant savings in drying energy.
- A better hold-out of the coating layer will improve optical characteristics of the paper, in particular fiber coverage and sheet gloss when 100% natural ground calcium carbonate (GCC) is used in the pigment system. Fast setting of the coating favors good coverage.
- Higher intrinsic water retention allows for reduction of additives, thickeners, and the like.
- A more uniform binder distribution due to reduced migration into the base paper and gentler drying contribute to better printability.

For the reasons outlined above, producers of coated paper have continuously optimized their formulations to maximize solids. However, if the solids content is raised beyond certain limits, this will have a detrimental impact on process efficiency and paper quality. Rheology limitations or poor blade runnability may result in scratching, bleeding or whiskering. Furthermore, excessive blade load for controlling the target coat weight results in a higher number of web breaks and increased blade wear. Very often the concentration of coating pigment slurries is not sufficient to produce high solids colours, then other components (mainly binders) dilute the concentration significantly. Moreover, a higher concentration of the slurries result in substantial savings in transportation costs, storage capacity and reduces the addition of microbiocides.

For every coating colour, there is a so-called "immobilization point", which is the given solids point at which the coating colour has lost any "plasticity" or deformation ability and its viscosity increases suddenly "ad infinitum".

In blade coating, there are three possible scenarios of solids content. In Scenario 1, the solids content is too low and several drawbacks result from the low colour concentration, such as poor hold-out, coating shrinkage and profile instability. Scenario 2 is the narrow operating window where the solids have been optimized. Finally, scenario 3 illustrates a too ambitious solids content where serious drawbacks are to be expected with regard to machine runnability. In general, it is desired to extend the immobilization point as much as possible.

As discussed above, the solids content of a coating composition should be as high as possible while still keeping viscosity on an acceptable level so as to avoid detrimental effects on blade coater runnability. However, when taking measures for improving the balance between high solids content and viscosity, it is important to consider that these measures should not impair optical properties of the final paper coating.

Glossy paper grades demand very fine pigments so as to produce an uninterrupted surface with high specular gloss.

U.S. Pat. No. 3,714,107 discloses an aqueous paper coating composition having a solids content of at least 70 wt %, said solids comprising a coarse ground pigment, a finely divided pigment and a coating binder, wherein the coarse ground pigment comprises from 25 to 90 wt % of the total pigment content.

DE 29 43 653 discloses a high solids coating based on calcium carbonate, wherein the calcium carbonate has a weight percentage of particles having a diameter of less than 2 μm of 100%.

DE 39 24 846 A1 discloses an aqueous paper coating composition comprising a pigment blend made of 60 to 95 wt % of a coarse calcium carbonate having an average particle diameter of at least 2 μm, and 5 to 40 wt % of a synthetic organic pigment having an average particle diameter of less than 0.8 μm.

Normally, pigments such as calcium carbonate pigments to be used in the paper coating process are provided by the pigment producer (e.g. calcium carbonate producers) in the form of an aqueous slurry. The producers of coated papers are then preparing the final composition at the paper coating facility. For the same reasons already outlined above, the solids content of these slurries should be as high as possible while still keeping viscosity on an acceptable level. Maximized solids content means to minimize transportation of unnecessary water and to reduce energy consumption for drying. For example, aqueous calcium carbonate slurries presently used, which still have an acceptable viscosity and enable the preparation of glossy paper, are available with a maximum solids content of 78 wt % for coarse to very fine BPSD ("broad particle size distribution") GCCs (60 to 95% <2 μm). Ultra-fine GCCs (99% <2 μm) can be delivered at max. 75% and NPSD ("narrow particle size distribution") GCCs merely at 72%.

It is an object of the present invention to provide an aqueous mineral slurry such as a calcium carbonate slurry which is useful for the preparation of a high solids coating formulation and also enabling the production of glossy paper. The aqueous mineral (e.g. calcium carbonate) slurry should provide an optimized balance between high solids content, viscosity which is still on an acceptable level and does not impair processability, and good optical properties such as high gloss.

The object is solved by providing an aqueous slurry comprising a mineral material which has a percentage $P_5$ by weight of particles having a diameter of less than 5.0 μm of from 98.5% to 90%, a percentage $P_2$ by weight of particles having a diameter of less than 2.0 μm of from 96% to 80%, wherein the ratio of $P_2/P_5$ is from 0.98 to 0.85, and wherein the slurry has a solids content of more than 78 wt %.

In the present invention, it was realized that a mineral material such as calcium carbonate having a specific percentage of very coarse particles in combination with a main fraction of fine or very fine particles can be used for the preparation of a high solids slurry which still has a viscosity on an acceptable level. Furthermore, although the mineral material comprises very coarse particles, the aqueous slurry of the present invention still enables the manufacture of high gloss paper.

In the present invention, the term "slurry" refers to a suspension having pigment particles dispersed therein.

The mineral material can be selected from calcium carbonate, clay, or mixtures thereof.

Preferably, the mineral material is natural ground calcium carbonate.

Preferably, the natural ground calcium carbonate (also known as "GCC") is selected from marble, limestone, chalk, or mixtures thereof. Preferably, it contains at least 95 wt %, more preferably more than 98 wt % calcium carbonate. GCC is well-known to the skilled person and is commercially available, e.g. from Omya. As will be explained below in further detail, the GCC of the aqueous slurry having the particle size distribution as described above and further below can be obtained by mixing two or more GCC starting materials. These GCC starting materials can be commercially available materials, or can be obtained by subjecting commercially available GCC materials to a further grinding procedure.

In a preferred embodiment, the mineral material, more preferably the natural ground calcium carbonate has a percentage $P_5$ by weight of particles having a diameter of less than 5.0 μmm of from 98.5% to 91%, more preferably 98% to 93%.

In a preferred embodiment, the mineral material, more preferably the natural ground calcium carbonate has a percentage $P_2$ by weight of particles having a diameter of less than 2.0 μmm of from 95% to 82%, more preferably 95% to 85%.

Preferably, the ratio of $P_2/P_5$ is from 0.96 to 0.85 more preferably from 0.94 to 0.89.

Preferably, the slurry has a solids content of at least 79 wt %, more preferably at least 80 wt %, and even more preferably at least 80.5 wt %. With regard to the upper limit, the solids content can be 83 wt % or less, e.g. 81 wt % or less.

In the present invention, the mineral material such as the natural ground calcium carbonate can have a percentage $P_1$ by weight of particles having a diameter of less than 1.0 μm of from 88% to 60%, more preferably of from 80% to 65%.

The ratio of $P_1/P_5$ can be from 0.89 to 0.65, more preferably of from 0.85 to 0.70.

The ratio of $P_1/P_2$ can be from 0.92 to 0.75, more preferably from 0.90 to 0.76.

Preferably, the mineral material such as the natural ground calcium carbonate has a median particle size $d_{50}$ of from 0.40 μmm to 0.75 μm, more preferably of from 0.45 μmm to 0.70 μm.

Throughout the present invention, $d_{50}$ is the medium particle size by weight, i.e. representing the particle size so that 50 wt % of the particles are coarser or finer.

Preferably, the mineral material such as the natural ground calcium carbonate has a specific BET surface area of from 12 m²/g to 19 m²/g, more preferably of from 14 m²/g to 18 m²/g.

In a preferred embodiment, the mineral material such as natural ground calcium carbonate of the aqueous slurry contains a first fraction having a percentage $P_2(F1)$ by weight of particles having a diameter of less than 2.0 μm of from 30% to 45%, more preferably from 35% to 45%, and a median particle diameter $d_{50}$ of from 2.0 to 3.0 μm, more preferably from 2.2 μm to 2.6 μm; and a second fraction having a percentage $P_2(F2)$ by weight of particles having a diameter of less than 2.0 μm of from 85% to 100%, more preferably from 90% to 96%, and a median particle diameter $d_{50}$ of from 0.3 to 0.75 μm, more preferably from 0.4 μm to 0.6 μm.

According to another preferred embodiment, the mineral material (e.g. natural ground calcium carbonate) contains a first fraction having a percentage $P_5(F1)$ by weight of particles having a diameter of less than 5.0 μm of from 75% to 85%, more preferably from 80% to 85% and a median particle diameter $d_{50}$ of from 2.0 to 3.0 μm, more preferably from 2.3 μm to 2.7 μm; and a second fraction having a percentage $P_2(F2)$ by weight of particles having a diameter of less than 2.0 μm of from 85% to 100%, more preferably from 95% to 100%, and a median particle diameter $d_{50}$ of from 0.3 to 0.65 μm, more preferably from 0.3 μm to 0.6 μm. Preferably, first fraction has a percentage $P_2(F1)$ by weight of particles having a diameter of less than 2.0 μm of from 30% to 45%, more preferably from 35% to 45%.

The first fraction can have a percentage $P_1(F1)$ by weight of particles having a diameter of less than 1.0 μm of from 20% to 22%.

Preferably, the ratio of the median particle diameter $d_{50}$ of the first fraction to the median particle diameter $d_{50}$ of the second fraction is at least 3.5, more preferably at least 4.0.

Preferably, the weight ratio of the first fraction to the second fraction is from 5/95 to 20/80, more preferably from 7/93 to 15/85.

The first fraction can have a specific BET surface area of from 3.0 m²/g to 4.5 m²/g, more preferably from 3.5 m²/g to 4.2 m²/g.

The second fraction can have specific BET surface area of from 10 m²/g to 22 m²/g, more preferably from 16 m²/g to 22 m²/g.

The slurry may further comprise a dispersing agent.

The dispersing agent can be selected from those commonly known to the skilled person. Preferably, the dispersing agent is selected from polyacrylates.

The dispersing agent can be present in an amount of from 0.4 wt % to 0.9 wt %, more preferably from 0.4 wt % to 0.6 wt %, based on dry solids.

As already indicated above, after having obtained the mineral (e.g. calcium carbonate) slurry from the mineral producer, the coated paper producer is preparing the final coating composition at the coating facility, e.g. by adding further components such as a binder, in particular latex particles.

It is preferred that the slurry of the present invention does not contain latex particles. Even more preferably, the slurry does not contain any binder such as starch, latex, soja protein and/or PVA.

Optionally, in addition to the mineral material such as clay and/or ground natural calcium carbonate, the aqueous slurry may contain further inorganic particles.

In principle, the slurry of the present invention may also comprise precipitated calcium carbonate (also known as PCC). However, it maybe preferred that the slurry does not contain any PCC.

In the present invention, it may also be preferred that the mineral material, in particular the natural ground calcium carbonate, as described above is the only inorganic material which is present in the aqueous slurry.

Preferably, the calcium carbonate, in particular the ground natural calcium carbonate represents at least 90 wt %, more preferably at least 95 wt %, even more preferably at least 98 wt %, and most preferably 100 wt % of the mineral material.

According to a second aspect, the present invention also provides a mineral material, preferably a dry mineral material, which has a percentage $P_5$ by weight of particles having a diameter of less than 5.0 μm of from 98.5% to 90%, a percentage $P_2$ by weight of particles having a diameter of less than 2.0 μm of from 96% to 80%, wherein the ratio of $P_2/P_5$ is from 0.98 to 0.85.

In the present invention, the term "dry" preferably refers to a material having a water content of less than 10 wt %, more preferably less than 5 wt %, even more preferably less than 2 wt %.

With regard to further properties of the mineral material according to the second aspect of the present invention, reference can be made to the statements provided above when defining the first aspect of the present invention.

According to a further aspect, the present invention provides a process for the preparation of an aqueous slurry having a solids content of more than 78 wt %, wherein a first fraction F1 of a mineral material is provided which has a percentage $P_5$(F1) by weight of particles having a diameter of less than 5.0 μm of from 75% to 85%, preferably from 80% to 85%, and a median particle diameter $d_{50}$ of from 2.0 to 3.0 μm, preferably from 2.3 to 2.7 μm; and a second fraction F2 of a mineral material is provided which has a percentage $P_2$(F2) by weight of particles having a diameter of less than 2.0 μm of from 85% to 100%, preferably from 95% to 100%, and a median particle diameter $d_{50}$ of from 0.3 to 0.65 μm, preferably from 0.3 to 0.6 μm; and both fractions are dispersed in water. Preferably, first fraction has a percentage $P_2$(F1) by weight of particles having a diameter of less than 2.0 um of from 30% to 45%, more preferably from 35% to 45%.

The first fraction can have a percentage $P_1$(F1) by weight of particles having a diameter of less than 1.0 μm of from 20% to 22%.

Preferably, the weight ratio of the first fraction to the second fraction is from 5/95 to 20/80, more preferably from 7/93 to 15/20

Furthermore, the first fraction F1 may be provided as a dry mineral material, and in another preferred embodiment the second fraction may be provided as an aqueous slurry.

The mineral material can be selected from calcium carbonate, clay, or mixtures thereof. Preferably, the mineral material is natural ground calcium carbonate.

With regard to further properties of the first and second fractions and with regard to the properties of the final blend and the aqueous slurry, reference is made to the statements provided above when defining the aqueous slurry of the present invention.

The particle size distribution of each fraction can be adjusted by methods commonly known to the skilled person, e.g. by a conventional grinding step.

In a preferred embodiment of the process according to the present invention, a dispersing agent is added to the slurry. With regard to the type and amount of dispersing agent, reference is made to the statements provided above when discussing the aqueous slurry.

According to a further aspect, the present invention provides the use of the aqueous slurry as defined above for wet-end applications, coating applications, paint applications, filling applications, concrete and/or sealants.

Preferably, the aqueous slurry is used for paper coating.

According to a further aspect, the present invention provides the use of the mineral composition according to the second aspect of the present invention in plastics applications, preferably as a filler or additive in plastics.

The invention will now be described in further detail by making reference to the following examples.

EXAMPLES

I. Measuring Methods

All the parameters described above for defining the product and the process of the present invention were determined by using the following measuring methods.

1. Medium Particle Size $d_{50}$ by weight and Weight Percentage of Particles Having a Diameter of less than 5.0 μm, less than 2.0 μm, and less than 1.0 μm, Respectively.

Throughout the present invention, $d_{50}$ is the medium particle size by weight, i.e. representing the particle size so that 50 wt % of the particles are coarser or finer.

Particle size was measured according to the sedimentation method. The sedimentation method is an analysis of sedimentation behaviour in a gravimetric field. The measurement is made with a Sedigraph™ 5100 of Micromeritics Instrument Corporation. The method and the instrument are known to the skilled person and are commonly used to determine grain size of fillers and pigments. The measurement is carried out in an aqueous solution of 0.1 wt % $Na_4P_2O_7$. The samples were dispersed using a high speed stirrer and supersonic.

2. Specific Surface Area (BET)

The specific surface area was measured using nitrogen and the BET method according to ISO 9277.

3. Solids Content

Solids content of the slurry was determined as follows: Solids content is determined by using special scales provided of drying (IR lamp or microwave). The final solids is obtained when a constant weight of the sample is reached (no more water to be removed).

4. Viscosity (Brookfield)

Brookfield viscosity of the slurry was determined as follows: Slurry viscosity is evaluated by a Brookfield Viscometer at 100 rpm and 20° C.

5. Sheet gloss 75° Tappi

Sheet gloss 75° Tappi was determined according to ISO 8254-1.

II. Preparation of Mineral Slurries

Example 1

A first natural dry ground calcium carbonate GCC (GCC 1) was provided which had the following properties:
$d_{50}$: 2.5 μm
81.4% <5.0 μm
42.5% <2.0 μm
BET surface area: 3.9 m$^2$/g A second natural calcium carbonate GCC (GCC 2) wet ground at 78 wt % solids content in the presence of a polyacrylate dispersant was provided which had the following properties:
$d_{50}$: 0.55 μm
100% <5.0 μm
96.3% <2.0 μm
78% <1.0 μm
BET surface area: 16 m$^2$/g GCC1 and GCC2 were mixed in a weight ratio GCC1/GCC2 of 5/95.

The final GCC material had the following properties:
98.1% <5.0 μm
93.3% <2.0 μm
74.3% <1.0 μm
$d_{50}$: 0.58 μm The aqueous slurry AS1 had a solids content adjusted to 80 wt %. Brookfield viscosity: 440 mPas Example 2

In Example 2, the same GCC1 and GCC2 as already described above in Example 1 were used.
GCC1 and GCC2 were mixed in a weight ratio GCC1/GCC2 of 8/92.
The final GCC material had the following properties:
93.4% <5.0 μm
91.8% <2.0 μm
72.9% <1.0 μm
$d_{50}$: 0.59 μm The aqueous slurry AS2 had a solids content adjusted to 80.3 wt %. Brookfield viscosity: 400 mPas.

Example 3

In Example 3, the same GCC1 and GCC2 as already described above in Example 1 were used.
GCC1 and GCC2 were mixed in a weight ratio GCC1/GCC2 of 10/90.
The final GCC material had the following properties:
96.6% <5.0 μm
90.1% <2.0 μm
71.2% <1.0 μm
$d_{50}$: 0.60 μm The aqueous slurry AS3 had a solids content adjusted to 80.4 wt %. Brookfield viscosity: 380 mPas.

Example 4

In Example 4, the same GCC1 and GCC2 as already described above in Example 1 were used.
GCC1 and GCC2 were mixed in a weight ratio GCC1/GCC2 of 16/84.
The final GCC material had the following properties:
94.8% <5.0 μm
88.5% <2.0 μm
68.1% <1.0 μm
$d_{50}$: 0.63 μm The aqueous slurry AS4 had a solids content adjusted to 80.2 wt %. Brookfield viscosity: 420 mPas.

Example 5

In Example 5, the same GCC1 and GCC2 as already described above in Example 1 were used.
GCC1 and GCC2 were mixed in a weight ratio GCC1/GCC2 of 20/80.
The final GCC material had the following properties:
93.7% <5.0 μm
83.4% <2.0 μm
65.1% <1.0 μm
$d_{50}$: 0.66 μm The aqueous slurry AS5 had a solids content adjusted to 80.8 wt %. Brookfield viscosity: 430 mPas.

Comparative Example 1

A natural calcium carbonate GCC6 wet ground at 78 wt % of solids content in the presence of a polyacrylate dispersant was provided which had the following properties:
100% <5.0 μm
95% <2.0 μm
80% <1.0 μm
$d_{50}$: 0.55 μm Thus, in contrast to Examples 1 to 5, no very coarse particles (i.e. particles having a diameter of more than 5.0 μm) were present in the GCC material used in Comparative Example 1.

The aqueous slurry AS6 had a solids content of 78 wt %. The slurry had a Brookfield viscosity of about 300 mPas. However, when the solids content was increased to about 80 wt %, there was a drastic increase of viscosity and the slurry could not be pumped anymore, i.e. could not be processed anymore.

III. Use of Mineral Slurries for Paper Coating

Using the inventive carbonate slurries AS2 and AS4 described above, paper coating compositions C2 and C4 were prepared. From slurry AS6 of Comparative Example 1, paper coating composition C6 was prepared.

In addition to the GCC component, each paper coating composition also contained a styrene-butadiene SB latex binder, a polyvinyl acetate PVA dispersing agent and a synthetic thickener.

For each sample, the weight ratio of GCC, SB latex, PVA, and thickener was the same, i.e. 100 parts GCC, 9 parts SB latex, 0.4 parts PVA, and 0.1 parts thickener.

For each paper coating composition C2, C4, and C6, the maximum solids content was determined by running pilot coater trials; needed dilutions were done in every trial until an absolutely clean blade and acceptable blade load could be reached (max blade deflection (load) 8 mm, stiff blade modus). The results are shown in Table 1.

The paper coating compositions C2, C4, and C6 were applied onto a paper and sheet gloss 75° Tappi was determined for each paper. The results are summarized in Table 1.

TABLE 1

Maximum solids content of coating color and sheet gloss of paper coating compositions

| Paper coating composition | Maximum solids content (wt %) | Sheet gloss 75° Tappi (%) |
|---|---|---|
| C4 (prepared by using slurry AS4) | 71.2 | 77/76 |
| C2 (prepared by using slurry AS2) | 70.4 | 78/77 |
| C6 (prepared by using slurry S6) | 69.2 | 78/79 |

The invention claimed is:

1. A paper coating, paper, paint, plastic, concrete or sealant comprising natural ground calcium carbonate which has a percentage $P_5$ by weight of particles having a diameter of less than 5.0 μm of from 98.5% to 90% and 1.5 to 10% by weight of particles having a diameter greater than 5.0 μm, a percentage $P_2$ by weight of particles having a diameter of less than 2.0 μm of from 96% to 80% and 4.0 to 20% by weight of particles having a diameter greater than 2.0 μm, wherein the ratio of $P_2/P_5$ is from 0.98 to 0.85.

2. The paper coating, paper, paint, plastic, concrete or sealant according to claim 1, wherein the natural ground calcium carbonate is obtained from marble, limestone, chalk, or any mixture thereof.

3. The paper coating, paper, paint, plastic, concrete or sealant according to claim 1, wherein the natural ground calcium carbonate has a percentage $P_1$ by weight of particles having a diameter of less than 1.0 μm of from 88% to 60%.

4. The paper coating, paper, paint, plastic, concrete or sealant according to claim 3, wherein the ratio of $P_1/P_5$ is from 0.75 to 0.65.

5. The paper coating, paper, paint, plastic, concrete or sealant according to claim 1, wherein the natural ground calcium carbonate has a percentage $P_1$ by weight of particles having a diameter of less than 1.0 μm of from 88% to 60%, and the ratio of $P_1/P_5$ is from 0.75 to 0.65.

6. The paper coating, paper, paint, plastic, concrete or sealant according to claim 1, wherein the natural ground calcium carbonate contains a first fraction having a percentage $P_5(F1)$ by weight of particles having a diameter of less than 5.0 μm of from 75% to 85% and a median particle diameter $d_{50}$ of from 2.0 to 3.0 μm, and a second fraction having a percentage $P_2(F2)$ by weight of particles having a diameter of less than 2.0 μm of from 85% to 100% and a median particle diameter $d_{50}$ of from 0.3 to 0.65 μm.

7. The paper coating, paper, paint, plastic, concrete or sealant according to claim 6, wherein the ratio of the median particle diameter $d_{50}$ of the first fraction to the median particle diameter $d_{50}$ of the second fraction is at least 3.5.

8. The paper coating, paper, paint, plastic, concrete or sealant according to claim 6, wherein the weight ratio of the first fraction to the second fraction is from 5/95 to 20/80.

9. The paper coating, paper, paint, plastic, concrete or sealant according to claim 1, wherein the percentage $P_5$ by weight of particles having a diameter of less than 5.0 μm is from 98% to 93% and 2 to 7% by weight of particles having a diameter greater than 5.0 μm.

10. The paper coating, paper, paint, plastic, concrete or sealant according to claim 1, wherein the percentage $P_5$ by weight of particles having a diameter of less than 5.0 μm is from 98% to 90% and 2 to 10% by weight of particles having a diameter greater than 5.0 μm.

11. The paper coating, paper, paint, plastic, concrete or sealant according to claim 1, which is a paper coating.

12. The paper coating, paper, paint, plastic, concrete or sealant according to claim 1, which is paper.

13. The paper coating, paper, paint, plastic, concrete or sealant according to claim 1, which is paint.

14. The paper coating, paper, paint, plastic, concrete or sealant according to claim 1, which is concrete.

15. The paper coating, paper, paint, plastic, concrete or sealant according to claim 1, which is a sealant.

* * * * *